(12) United States Patent
Brissette et al.

(10) Patent No.: US 11,979,310 B2
(45) Date of Patent: May 7, 2024

(54) SIGNAL TRANSLATION AND PROTECTION IN A HYBRID NETWORK ENVIRONMENT

(71) Applicant: Cisco Technology, Inc., San Jose, CA (US)

(72) Inventors: Patrice Brissette, Ontario (CA); Christian Schmutzer, Koenigsbrunn Im Weinviertel (AT); Luca Della Chiesa, Concorezzo (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 494 days.

(21) Appl. No.: 17/217,322

(22) Filed: Mar. 30, 2021

(65) Prior Publication Data
US 2022/0321451 A1 Oct. 6, 2022

(51) Int. Cl.
*H04L 12/46* (2006.01)
*H04L 41/0686* (2022.01)
*H04L 45/02* (2022.01)
*H04L 69/321* (2022.01)

(52) U.S. Cl.
CPC .............. *H04L 45/04* (2013.01); *H04L 12/46* (2013.01); *H04L 41/0686* (2013.01); *H04L 69/321* (2013.01)

(58) Field of Classification Search
None
See application file for complete search history.

(56) References Cited

U.S. PATENT DOCUMENTS

| | | | |
|---|---|---|---|
| 8,644,296 B1* | 2/2014 | Croak | H04L 65/1069 370/352 |
| 10,965,594 B2* | 3/2021 | Pan | H04L 12/28 |
| 2005/0099941 A1 | 5/2005 | Sestito et al. | |
| 2005/0213508 A1 | 9/2005 | Gerstel | |
| 2005/0249124 A1* | 11/2005 | Elie-Dit-Cosaque | H04L 43/10 370/242 |
| 2006/0098660 A1 | 5/2006 | Pal et al. | |
| 2008/0002669 A1 | 1/2008 | O'Brien et al. | |
| 2010/0208582 A1* | 8/2010 | Poulin | H04L 69/40 370/503 |

(Continued)

OTHER PUBLICATIONS

International Telecommunication Union, "Interworking of SDH network protection architectures", Recommendation G.842, Apr. 1997, 39 pages.

(Continued)

*Primary Examiner* — Emmanuel K Maglo
(74) *Attorney, Agent, or Firm* — Edell, Shapiro & Finnan, LLC

(57) ABSTRACT

Techniques are provided for signal translation in a hybrid network environment. In one example, a first provider edge node obtains a connection status indication from a first one of a second provider edge node via a packet switched network or a third provider edge node via a time-division multiplexing transport network. The first provider edge node translates the connection status indication between a packet switched network format and a time-division multiplexing transport network format. The first provider edge node provides the connection status indication to a second one of the second provider edge node via the packet switched network or the third provider edge node via the time-division multiplexing transport network.

20 Claims, 5 Drawing Sheets

(56) References Cited

U.S. PATENT DOCUMENTS

| | | | |
|---|---|---|---|
| 2013/0010683 A1* | 1/2013 | Kishita | H04L 45/304 370/315 |
| 2015/0043330 A1* | 2/2015 | Hu | H04L 49/557 370/225 |
| 2015/0098338 A1* | 4/2015 | Bhattacharya | H04L 45/22 370/241.1 |
| 2017/0201323 A1* | 7/2017 | Prakash | H04Q 11/0001 |
| 2017/0244632 A1* | 8/2017 | Tang | H04L 9/40 |
| 2018/0351686 A1* | 12/2018 | Busi | H04J 14/0273 |
| 2020/0153525 A1 | 5/2020 | Annavajjala et al. | |

OTHER PUBLICATIONS

J. Kuhfeld et al., "Definitions of Managed Objects for Synchronous Optical Network (SONET) Linear Automatic Protection Switching (APS) Architectures", Network Working Group, Request for Comments: 3498, Category: Standards Track, Mar. 2003, 43 pages.

Y. Weingarten, Ed. et al., "MPLS Transport Profile (MPLS-TP) Linear Protection", Internet Engineering Task Force (IETF), Request for Comments: 6378, Category: Standards Track, ISSN: 2070-1721, Oct. 2011, 45 pages.

N. Sprecher, Ed. et al., "MPLS Transport Profile (MPLS-TP) Survivability Framework", Internet Engineering Task Force (IETF), Request for Comments: 6372, Category: Informational, ISSN: 2070-1721, Sep. 2011, 56 pages.

Telcordia Technologies, Inc., "Synchronous Optical Network (SONET) Transport Systems: Common Generic Criteria", Telcordia Technologies Generic Requirements GR-253-CORE, Issue 4, Dec. 2005, 697 pages.

W. Cheng et al., "Dual-Homing Coordination for MPLS Transport Profile (MPLS-TP) Pseudowires Protection", Internet Engineering Task Force (IETF), Request for Comments: 8185, Category: Standards Track, ISSN: 2070-1721, Jun. 2017, 17 pages.

W. Cheng et al., "Dual-Homing Protection for MPLS and the MPLS Transport Profile (MPLS-TP) Pseudowires", Internet Engineering Task Force (IETF), Request for Comments: 8184, Category: Informational, ISSN: 2070-1721, Jun. 2017, 11 pages.

International Telecommunication Union, "Dual-homing protection for multi-protocol label switching transport profile pseudowires", Recommendation ITU-T G.8133, Aug. 2019, 22 pages.

A. Vainshtein, Ed. et al., "Structure-Agnostic Time Division Multiplexing (TDM) over Packet (SAToP)", Network Working Group, Request for Comments: 4553, Category: Standards Track, Jun. 2006, 27 pages.

International Telecommunication Union, "Optical Transport Network (OTN): Linear protection", Recommendation ITU-T G.873.1, Jul. 2011, 30 pages.

Cisco, "Automatic Protection Switching Configuration", downloaded from the Internet Dec. 5, 2020, 6 pages.

Cisco Community, "ICRM and PGP sessions (MR-APS with stateful MLPPP)", Jun. 30, 2016, 5 pages.

International Telecommunication Union, "Ethernet linear protection switching", Recommendation ITU-T G.8031/Y.1342, Jan. 2015, 96 pages.

IEEE, "G.8031 1:1 Linear Protection Switching", ITU-T Q9 SG15, https://www.ieee802.org/1/files/public/docs2007/liaison-itutq915-g8031-in-pbbte.pdf, downloaded from the Internet Dec. 3, 2020, 16 pages.

RF Wireless World 2012, "Automatic Protection Switching,APS,SDH,SONET", https://www.rfwireless-world.com/Articles/APS-Automatic-Protection-Switching-SDH-SONET.html, downloaded from the Internet Sep. 14, 2020, 7 pages.

Cisco, "Overview", Cisco Nexus 7000 Series NX-OS MPLS Configuration Guide, downloaded from the Internet Sep. 13, 2020, 10 pages.

Cisco, "Configuring Redundancy for POS/APS", Document ID: 14680, http://www.cisco.com/warp/customer/127/POS/pos-aps_14680.html, Jan. 10, 2006, 15 pages.

Cisco Systems, Inc., "Time Division Multiplexing Configuration Guide, Cisco IOS XE Release 3S (Cisco ASR 900 Series)", Nov. 1, 2014, 166 pages.

International Telecommunication Union, "Ethernet ring protection switching", Recommendation ITU-T G.8032/Y.1344, Mar. 2020, 82 pages.

International Telecommunication Union, "Ethernet linear protection switching", Amendment 1, Recommendation ITU-T G.8031/Y.1342, Mar. 2018, 98 pages.

International Telecommunication Union, "Optical transport network: Linear protection", Recommendation ITU-T G.873.1(2017)/Corrigendum 1, Mar. 2020, 40 pages.

International Telecommunication Union, "Interfaces for the optical transport network", Recommendation ITU-T G.709/Y.1331, Jun. 2020, 280 pages.

G. Mirsky et al., "Simple Two-way Active Measurement Protocol Optional Extensions draft-ietf-ippm-stamp-option-tlv-10", Network Working Group, Nov. 15, 2020, 32 pages.

R. Gandhi, Ed. et al., "Performance Measurement Using Simple TWAMP (STAMP) for Segment Routing Networks draft-gandhi-spring-stamp-srpm-04", Spring Working Group, Jan. 12, 2021, 21 pages.

Iana, "Generic Associated Channel (G-ACh) Parameters", Feb. 7, 2014, 10 pages.

G. Mirsky et al., "RFC 8762 Simple Two-Way Active Measurement Protocol", Internet Engineering Task Force (IETF), ISSN: 2070-1721, Mar. 2020, 15 pages.

S. Boutros et al., "Virtual Private Wire Service Support in Ethernet VPN", Internet Engineering Task Force (IETF), ISSN: 2070-1721, Aug. 2017, 17 pages.

W. Cheng et al., "Dual-Homing Coordination for MPLS Transport Profile (MPLS-TP) Pseudowires Protection", Internet Engineering Task Force (IETF), ISSN: 2070-1721, Jun. 2017, 17 pages.

S. Bryant et al., "UDP Return Path for Packet Loss and Delay Measurement for MPLS Networks", Internet Engineering Task Force (IETF), Jul. 2016, 10 pages.

A. Sajassi, Ed. et al., "BGP MPLS-Based Ethernet VPN", Internet Engineering Task Force (IETF), ISSN: 2070-1721, Feb. 2015, 56 pages.

D. Frost et al., "Packet Loss and Delay Measurement for MPLS Networks", Internet Engineering Task Force (IETF), ISSN: 2070-1721, Sep. 2011, 52 pages.

M. Bocci, Ed. et al., "MPLS Generic Associated Channel", Network Working Group, Jun. 2009, 19 pages.

K. Hedayat et al., "A Two-Way Active Measurement Protocol (TWAMP)", Network Working Group, Oct. 2008, 26 pages.

S. Shalunov et al., "A One-way Active Measurement Protocol (OWAMP)", Network Working Group, Sep. 2006, 56 pages.

S. Bryant et al., "Pseudowire Emulation Edge-to-Edge (PWE3) Control Word for Use over an MPLS PSN", Network Working Group, Feb. 2006, 12 pages.

* cited by examiner

US 11,979,310 B2

SIGNAL TRANSLATION AND PROTECTION IN A HYBRID NETWORK ENVIRONMENT

TECHNICAL FIELD

The present disclosure relates to telecommunications technology.

BACKGROUND

Transport networks mandate 1+1 end-to-end path protection switching architectures with bi-directional protection switch coordination. Packet networks today generally do not support that. A packet network can be used to carry private line circuits via dual handoff to a transport network.

DESCRIPTION OF EXAMPLE EMBODIMENTS

Overview

Techniques are provided for signal translation in a hybrid network environment. In one example, a first provider edge node obtains a connection status indication from a first one of a second provider edge node via a packet switched network or a third provider edge node via a time-division multiplexing transport network. The first provider edge node translates the connection status indication between a packet switched network format and a time-division multiplexing transport network format. The first provider edge node provides the connection status indication to a second one of the second provider edge node via the packet switched network or the third provider edge node via the time-division multiplexing transport network.

Example Embodiments

For multi-homing transport networks, convergence from one destination node to another should occur within 50 ms. End-to-end path protection in hybrid networks may enable short convergence times by performing protection switching based on a local decision at either endpoint of a bidirectional circuit. However, the independence of the endpoints introduces the need for protection switch coordination to ensure that traffic flows on the same circuit in both directions. Coordination is involved not only for failures but also for operator-driven switch requests. It is particularly challenging to achieve in systems with endpoints in different domains. Accordingly, techniques are presented herein to satisfy requirements for short convergence times (e.g., 50 ms protection) and protection switch coordination in hybrid networks.

Figure 1:
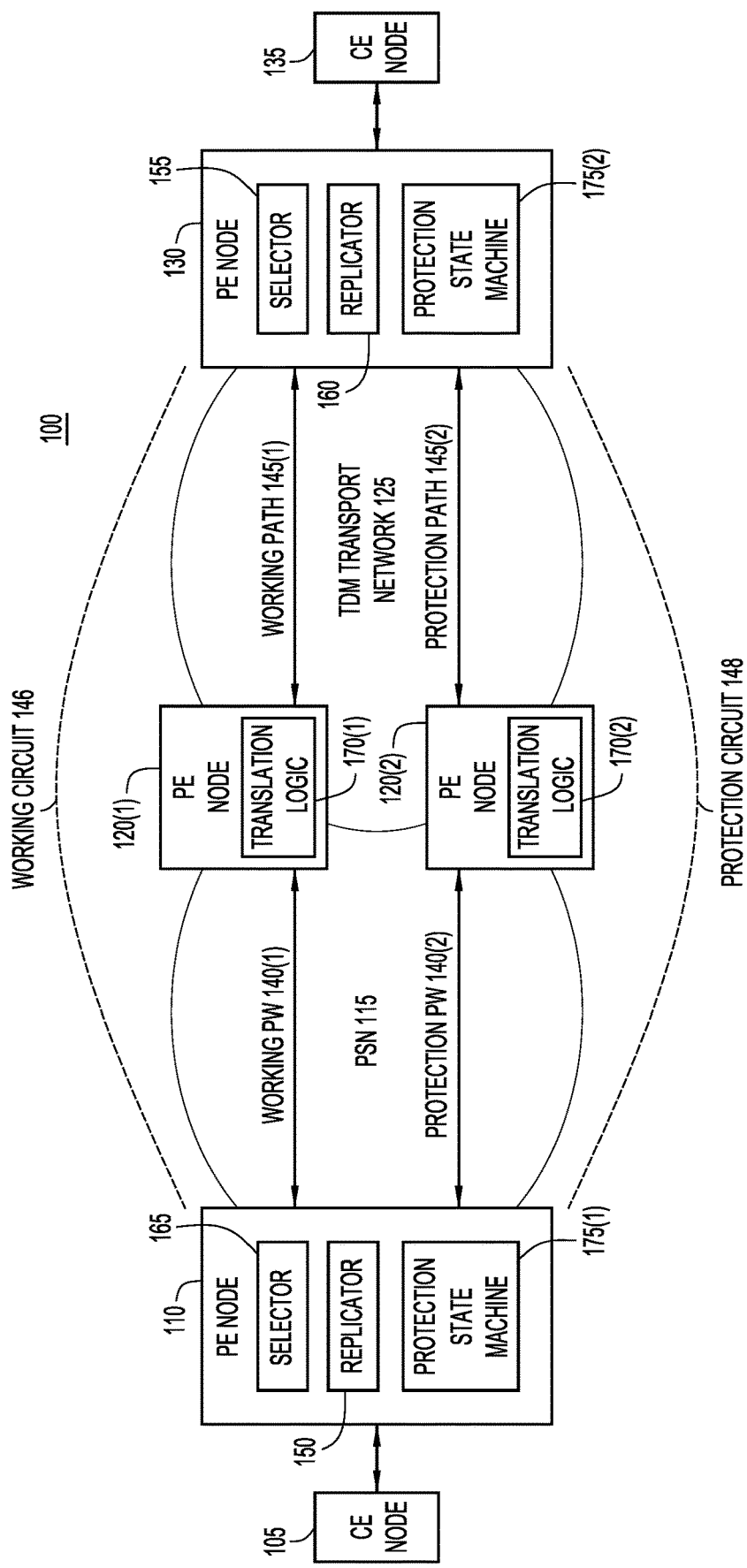
FIG. 1 illustrates a block diagram of a system configured for signal transport in a hybrid network environment, according to an example embodiment.

FIG. 1 illustrates a block diagram of an example system 100 configured for signal transport in a hybrid network environment. System 100 includes Customer Edge (CE) node 105, Provider Edge (PE) node 110, Packet-Switched Network (PSN) 115, PE node 120(1) and PE node 120(2), Time-Division Multiplexing (TDM) transport network 125, PE node 130, and CE node 135. PSN 115 and TDM transport network 125 may be considered as a single hybrid network. PE node 110 and PE node 130 serve as respective edge nodes of the hybrid network, and PE node 120(1) and PE node 120(2) act as gateway nodes between PSN 115 and TDM transport network 125. PE node 130 may also be referred to as a trail termination endpoint.

Working Pseudowire (PW) 140(1) is configured on PE node 110 and PE node 120(1), and protection PW 140(2) is configured on PE node 110 and PE node 120(2). Working PW 140(1) enables communication between PE node 110 and PE node 120(1). Protection PW 140(2) enables communication between PE node 110 with PE node 120(2). PSN 115 may include one or more transit nodes (not shown) configured to carry PW network packets between PE node 110 and PE node 120(1), and between PE node 110 and PE node 120(2). The transit nodes may be agnostic to working PW 140(1) and protection PW 140(2).

TDM transport network 125 includes working path 145(1) and protection path 145(2). Working path 145(1) enables communication between PE node 120(1) and PE node 130. Protection path 145(2) enables communication between PE node 120(2) and PE node 130. TDM transport network 125 may include one or more transit nodes (not shown) configured to carry signals between PE node 120(1) and PE node 130, and between PE node 120(2) and PE node 130.

Any suitable mix of domains may converge in the hybrid network, such as, and not limited to, Ethernet Virtual Private Wire Service (Ethernet VPWS), Synchronous Optical Network (SONET) circuit emulation, Synchronous Digital Hierarchy (SDH) circuit emulation, Plesiochronous Digital Hierarchy (PDH) circuit emulation, Private Line Emulation (PLE), Optical Transport Networking (OTN), SONET/SDH, Ethernet G.8031, Ethernet G.8032, etc. Specific examples of possible combinations of network technologies include: PLE and OTN; Circuit Emulation over Packet (CEP) and SONET; CEP and SDH; Ethernet VPWS and OTN; and Ethernet VPWS and G.803x. Any nomenclature used herein that is specific to a given technology may be substituted for appropriate nomenclature that is applicable to any other suitable technology. This may include terminology regarding respective alarm signals, Automatic Protection Switching (APS) protocols, etc.

PSN 115 may utilize any suitable transport mechanism (e.g., Ethernet). PSN 115 may run Multiprotocol Label Switching (MPLS), an Interior Gateway Protocol (IGP) such as Open Shortest Path First (OSPF) or Intermediate System-to-Intermediate System (IS-IS), or any combination thereof. PSN 115 may also run a traffic engineering protocol such as Resource Reservation Protocol for Traffic Engineering (RSVP-TE) or Segment Routing for Traffic Engineering (SR-TE). Any suitable paradigm/protocol may be utilized in conjunction with the techniques presented herein for PSN 115. PSN 115 may use any suitable packet switching and/or tunneling technology, such as Layer 2 Tunneling Protocol (L2TP), User Datagram Protocol (UDP), Internet Protocol (IP), etc. PSN 115 may also/alternatively be based on IP or Segment Routing for IP version 6 (SRv6). TDM transport network 125 may also utilize any suitable transport mechanism(s), such as SONET, SDH, OTN technology, etc.

Moreover, working PW 140(1) and protection PW 140(2) may be established via any suitable technology, such as Targeted Label Distribution Protocol (T-LDP) for VPWS or Border Gateway Protocol (BGP) as defined by Ethernet Virtual Private Network for VPWS (EVPN-VPWS). In one example, working PW 140(1) and/or protection PW 140(2) may belong to a PLE circuit. To that end, PE node 110, PE node 120(1), and PE node 120(2) may be configured to communicate using PLE techniques, though it will be appreciated that other scenarios, such as Circuit Emulation (CEM), may also apply. In another example, Ethernet VPWS may be used in conjunction with Ethernet over SONET across TDM transport network 125.

To ensure that communication between PE node 110 and PE node 130 is uninterrupted, PE node 120(1) and PE node 120(2) may provide a redundant interconnection over PSN 115 and TDM transport network 125. Specifically, a network operator may deliver working circuit 146 and protection circuit 148, each of which spans PSN 115 and TDM transport network 125 between CE node 105 and CE node 135. Working circuit 146 may include PE node 110, working PW 140(1), PE node 120(1), working path 145(1), and PE node 130. Protection circuit 148 may include PE node 110, protection PW 140(2), PE node 120(2), protection path 145(2), and PE node 130. For both working circuit 146 and protection circuit 148, PE node 110 is an endpoint that faces CE node 105, and PE node 130 is an endpoint that faces CE node 135.

Working circuit 146 and protection circuit 148 may carry similar/identical networking signals. PE node 110, acting as a traffic source, includes a replicator 150 configured to create two copies of network traffic received from CE node 105 (e.g., via a client/access interface). PE node 110 sends a first copy of the network traffic over working circuit 146 and a second copy of the network traffic over protection circuit 148. The first copy of network traffic crosses the boundary between PSN 115 and TDM transport network 125 via PE node 120(1), while the second copy uses PE node 120(2) to cross the boundary. Both copies are ultimately received by PE node 130, which acts as a traffic sink.

Selector 155 at PE node 130 is configured to choose network traffic from either working circuit 146 or protection circuit 148. Selector 155 may choose between the copies based on the presence of a failure and/or manual switch request. PE node 130 transmits the chosen network traffic to CE node 135 (e.g., via a client/access interface) and drops the other copy of network traffic. Selector 155 may perform protection switching autonomously, independent of any control plane interaction or message exchange with PE node 110. In one example, PE node 130 implements TDM data plane based loss of signal detection and protection-switches to the other copy of network traffic if a fault is detected.

A similar process may unfold in the reverse direction, whereby PE node 130 acts as a source and creates two copies of network traffic, and PE node 110 selects one of the copies. PE node 130 may include replicator 160 configured to duplicate the network traffic, and PE node 110 may also include selector 165 configured to choose one copy of the network traffic and drop the other. In one example, replicator 160 may be a bitstream replicator and selector 165 may be a packet-loss-based selector that chooses a given copy of network traffic based on VPWS receive packet loss detection.

In order to enable system 100, and in particular to ensure that notifications of failures and other connection status indications are relayed across the hybrid network, PE node 120(1) and PE node 120(2) are configured with translation logic 170(1) and translation logic 170(2), respectively. Briefly, translation logic 170(1)/170(2) causes PE node 120(1)/120(2) to act as a packet/TDM gateway that translates connection status indications (e.g., data plane signals) transmitted between PE node 110 and PE node 130. Thus, PE node 120(1) and PE node 120(2) function as gateways that translate connection status indications between two network domains.

In one example, PE node 120(1) obtains a connection status indication from a first one of PE node 110 via PSN 115 or PE node 130 via TDM transport network 125. PE node 120(1) translates the connection status indication between a PSN format and a TDM transport network format, and provides the connection status indication to a second one of PE node 110 via PSN 115 or PE node 130 via TDM transport network 125. Translation logic 170(2) may cause PE node 120(2) to perform similar operations.

The PSN format may include any suitable format for transporting connection status indications in PSN 115, such as an Operations Administration and Maintenance (OAM) format. The TDM transport network format may include any suitable format for transporting connection status indications in TDM transport network 125, such as an OTN overhead format. Thus, in one example, PE node 120(1) and PE node 120(2) may translate between OAM overhead and OTN overhead to connect a VPWS instance in PSN 115 to an ODU circuit in TDM transport network 125.

Connection status indications may include any suitable information regarding a connection status that impacts (or could potentially impact) working circuit 146 and/or protection circuit 148 between PE node 110 and PE node 130. The connection status indications may be non-time-critical or time-critical. Non-time-critical connection status indications may include OTN overhead signals (e.g., ODU-TTI, ODU-OCI, ODU-LCK, etc.) and corresponding EVPN signaling messages. PE node 120(1) and PE node 120(2) may translate between the non-time-critical OTN overhead signals and their EVPN signaling or OAM message counterparts.

PE node 120(1) and PE node 120(2) may also translate time-critical packet data plane functions to OTN overhead signals. Time-critical connection status indications include OTN overhead signals such as ODU Client Signal Fail (CSF), ODU Backward Defect Indication (BDI), or ODU Alarm Indication Signal (AIS), which may be translated to packet data plane functions. Thus, PE node 120(1) and PE node 120(2) may translate between OTN fault signals (e.g., CSF, AIS, BDI, etc.) and functionally equivalent signals in the packet domain.

For example, PE node 120(1) and/or PE node 120(2) may translate an ODU CSF signal into an L bit set in the VPWS control word (or vice versa). As a result, PE node 120(1) and/or PE node 120(2) may provide an indication, via a transparently carried signal independent of underlying server connectivity, that the client experienced an issue (e.g., a failure). In another example, PE node 120(1) and/or PE node 120(2) may translate an ODU BDI signal into an R bit set in the VPWS control word (or vice versa). For instance, if PE node 120(1) receives an R bit (backward indication) via PSN 115, PE node 120(1) may inject a BDI into TDM transport network 125. In still another example, PE node 120(1) and/or PE node 120(2) may translate an ODU AIS into an indication that VPWS traffic is no longer being sent to the sink (or vice versa). For instance, if PE node 120(1)

stops receiving PW packets, it may send an AIS to PE node 130 alerting of a failure on PSN 115.

When a failure occurs and circuit switchover is needed, both PE node 110 and PE node 130 should be made aware of the switchover. This is a non-trivial issue because circuits are bidirectional in nature (e.g., both directions of a circuit should follow the same path) whereas protection switching is unidirectional. For example, consider a scenario in which working circuit 146 is used initially. If a unidirectional failure occurs from PE node 120(1) to PE node 130, PE node 130 would discover the failure but not PE node 110. Similarly, if packets from PE node 120(1) to PE node 110 are dropped, PE node 110 may detect the packet loss and switch to protection circuit 148, but that is a local decision and without more PE node 130 would not know that the packets are getting dropped.

Accordingly, further techniques are provided for performing protection switch coordination to enforce the appropriate bidirectional switching behavior and ensure end-to-end bidirectional flow. These techniques may help system 100 run in both directions over protection circuit 148 between two domains in the hybrid network environment, rather than (for example) one direction running over protection circuit 148 and the other direction over working circuit 146.

In the example of FIG. 1, PE node 110 and PE node 130 include protection state machines 175(1) and 175(2). Protection state machines 175(1) and 175(2) may be priority-based state machines configured to handle failures and operator requests (e.g., including interpreting protection information and determining when a switchover is necessary). Protection state machine 175(1) in particular may be a VPWS headend state machine. Protection state machines 175(1) and 175(2) may enable PE node 110 and PE node 130 to act as APS endpoints that make decisions regarding whether working circuit 146 or the protection circuit 148 should be used at any given time. The translation services provided by PE nodes 120(1) and 120(2) may help PE node 110 and PE node 130 to communicate with each other and coordinate the protection switching.

In one example, PE node 110 determines that PE node 130 is to switch over to PE node 120(2). For instance, PE node 110 may detect a unidirectional failure from PE node 120(1) to PE node 110. This may signal that there is a failure on working circuit 146 and switchover to protection circuit 148 is necessary. In order to ensure that PE node 130 switches over to protection circuit 148 along with PE node 110, PE node 110 provides a connection action request for PE node 130 to switch over to PE node 120(2). PE node 110 may provide the connection action request to PE node 130 via PE node 120(2).

The connection action request may include any suitable indication for PE node 130 to switch over to PE node 120(2). The connection action request may include a signaling packet, such as a dedicated OAM packet, indicating that PE node 130 is to switch over to PE node 120(2). The dedicated OAM packet may carry switch commands that are functionally similar to those carried inside the APS channel of the ODU overhead in TDM transport network 125.

The OAM packet is "dedicated" because it may primarily/exclusively carry information to communicate switch commands for triggering switching by PE node 130, rather than carrying actual data as part of the signal connection. A dedicated OAM packet may carry information including bridge type (e.g., 1+1 versus 1:n), directionality (e.g., bidirectional versus unidirectional), reversion (e.g., non-revertive versus revertive), and/or switch request (e.g., lockout of protection, forced switch to force state machine 175(2) to be switched to the protection path, signal far, signal degrade, manual switch, wait to restore, exercise, reverse request, do not revert, no request, signal loss, etc.).

PE node 110 and PE nodes 120(1) and 120(2) may exchange OAM messages regularly (e.g., periodically) by injecting the OAM messages into working PW 140(1) and/or protection PW 140(2). The OAM messages may reflect a current state of protection state machine 175(1). PE nodes 120(1) and 120(2) may also maintain an APS communication channel using the ODU overhead with PE node 130. The ODU overhead may regularly carry APS information that reflects a current state of protection state machine 175(2). Thus, payload translation between PW signals and ODU signals may enable APS communication between PE node 110 and PE node 130. For instance, PW messages may be translated into ODU information based on overhead and payload. A service OAM layer may be provided for bit stream traffic.

In a specific example, PE node 110 detects a fault that should trigger a protection switch from working circuit 146 to protection circuit 148. PE node 110 sends a dedicated OAM message to PE node 120(2) indicating the connection action request. PE node 120(2) receives the dedicated OAM message and translates it into a corresponding connection action request carried in ODU overhead to PE node 130. PE node 130 may switch over to PE node 120(2) and send an acknowledgement back to PE node 120(2). PE node 120(2) may translate the acknowledgement to a corresponding OAM message (e.g., a dedicated OAM packet) and send the OAM message to PE node 110 to signal that protection switch coordination has successfully occurred. Similar operations may apply for messages in the reverse direction (e.g., where a fault is detected by PE node 130). There are many applicable operational flows, such as when an operator issues a manual switch request to PE node 110 or PE node 130, or when working circuit 146 is recovered.

PE node 110 may provide the dedicated OAM packet via any suitable technology. In one example, PE node 110 may provide the dedicated OAM packet via a Border Gateway Protocol (BGP) message. Consider the scenario in which PE node 110 detects a fault on working PW 140(1) (e.g., because packets from PE node 120(1) to PE node 110 are dropped). In response to the dropped packets, PE node 110 may switch to protection PW 140(2) and implement a switch request. For example, PE node 110 may generate an EVPN signal fail switch request message in the form of a BGP route update and send the message using BGP to PE node 120(2). That is, the dedicated OAM packet may be carried by a BGP route message to announce a BGP update.

The gateway functionality at PE node 120(2) may receive the message and change the OTN overhead of the circuit to indicate a signal fail APS request. In particular, PE node 120(2) may translate the EVPN route update to an APS switch request to enable PE node 130 to perform switch protection. This may be an example of EVPN PLE to OTN APS translation. PE node 130 receives the translated OTN overhead and switches to protection circuit 148.

Conversely, if PE node 130 initially detects an ODU server layer fault, PE node 130 may switch from working path 145(1) to protection path 145(2) and send a signal fail APS switch request via protection path 145(2) to PE node 120(2). PE node 120(2) may detect the APS switch request and translate it into an EVPN signal fail switch request message in the form of a BGP route update and send the message using BGP to PE node 110. Upon receiving the EVPN signal fail switch request message, PE node 110 may switch from working PW 140(1) to protection PW 140(2), thereby ensuring that protection switching between PE node 110 and PE node 130 remains coordinated.

As an alternative to providing the dedicated OAM packet via BGP messaging, PE node 110 may also provide the dedicated OAM packet via a dedicated OAM control channel. This may involve similar operations as those described with respect to the BGP message example, but PE node 110 sends an OAM message indicating the signal fail request via the dedicated OAM control channel instead of using a route update. PE node 110 may thus trigger an on-demand OAM packet including the signal fail information over the dedicated OAM control channel. In one example, PE node 110 and PE node 120(2) may exchange OAM messages via a communication channel belonging to protection PW 140(2). A channel type may be introduced for this purpose.

Figure 2:
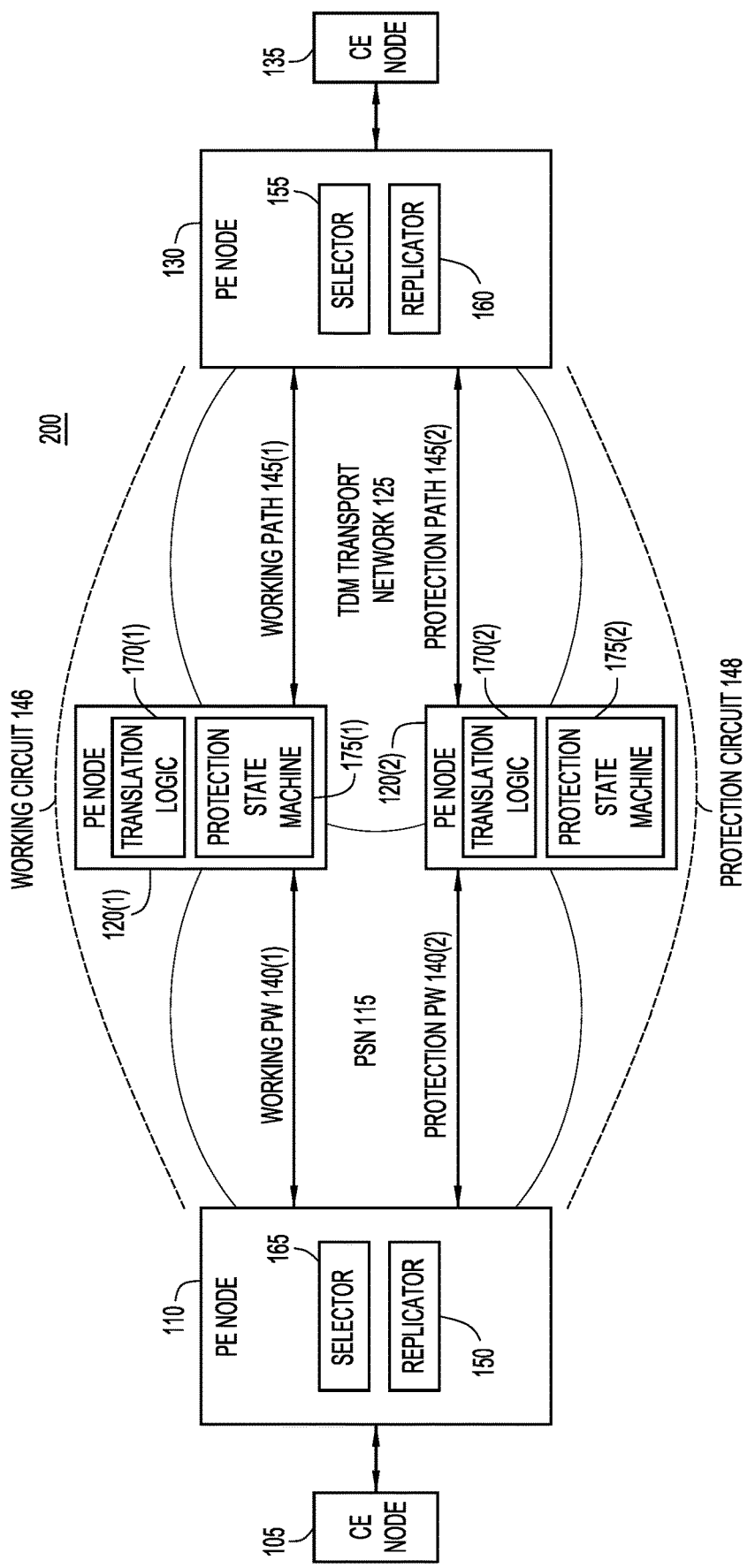
FIG. 2 illustrates another block diagram of a system configured for signal transport in a hybrid network environment, according to an example embodiment.

Turning now to FIG. 2, shown is a block diagram of an example system 200 configured for signal transport in a hybrid network environment. System 200 is similar to system 100, but state machine 175(1) is now implemented on PE node 120(1) instead of on PE node 110, and state machine 175(2) is now implemented on PE node 120(2) instead of on PE node 130. In system 100, PE nodes 110 and 130 detect failures, perform message generation, trigger switch coordination requests, and exchange switch request messaging; in system 200, PE node 120(1) and PE node 120(2) are responsible for managing switchover coordination. This is due to the respective placement of state machines 175(1) and 175(2) in system 100 and system 200. Whereas system 100 decouples the translation functionality (PE node 120(1) and PE node 120(2)) from the protection switch coordination functionality (PE node 110 and PE node 130), system 200 centralizes the translation and protection switch coordination functionalities on PE node 120(1) and PE node 120(2).

In one example, PE node 120(1) may initially serve as a Designated Forwarder (DF) for PE node 110 and PE node 130. PE node 120(2) is a non-DF for PE node 110 and PE node 130. Because PE node 120(1) is the DF, PE node 110 and PE node 130 select network traffic obtained via PE node 120(1) from working circuit 146. In the event of a failure, PE node 120(1) may communicate with PE node 120(2) and determine that PE node 120(2) is to become DF for PE node 110 and/or PE node 130. PE node 120(1) and PE node 120(2) may make this determination using protection state machine 175(1) and protection state machine 175(2), respectively. PE node 120(1) and PE node 120(2) may exchange messages over a communication channel via BGP updates using EVPN. An EVPN Ethernet segment setup between PE node 120(1) and PE node 120(2) may also/alternatively drive working circuit/protection circuit coordination with PE node 110 and/or PE node 130.

Consider an example in which PE node 120(1) influences EVPN multi-homing via OTN APS signaling. Initially, PE node 110 may detect a fault on working PW 140(1) and switch to protection PW 140(2). PE node 120(1) may obtain a notification that PE node 110 is unable to use working PW 140(1). PE node 120(1) may obtain the notification via any suitable mechanism (e.g., OAM, backward indication, etc.). A DF transition may occur between PE node 120(1) and PE node 120(2), whereby PE node 120(1) indicates that PE node 120(2) is to become the new DF. The DF transition may occur using any suitable mechanism, such as OAM mechanisms including VPWS status, Virtual Circuit Connectivity Verification (VCCV) (e.g., BFD), etc. Once PE node 120(2) has become the DF, it may send an OTN APS switch request message to PE node 130. The message causes PE node 130 to switch to PE node 120(2) and protection circuit 148. PE node 120(1) and/or PE node 120(2) may thereby translate between DF/NDF changes and APS requests sent over TDM transport network 125.

Any suitable sequence of operations may effectuate the DF transition. PE node 120(1) or PE node 120(2) may receive the first indication of a failure (or first detect the failure) and initiate the communication between PE node 120(1) and PE node 120(2). Depending on the specific scenario, PE node 120(1) or PE node 120(2) may provide, to PE node 110 and/or PE node 130, an indication that PE node 120(2) is to become the DF. If PE node 130 first detects the failure (e.g., a ODU server layer fault), it may switch to protection path 145(2) and send an APS switch request via protection path 145(2) to PE node 120(2). PE node 120(2) may send EVPN route updates to PE node 120(1) to trigger a DF transition. PE node 120(1) or PE node 120(2) may instruct PE node 110 to switch from working PW 140(1) to protection PW 140(2). PE node 120(2) may also implement a switch request and protection state machine 175(2) to react to operator requests, such as manual or forced switches.

Figure 3:
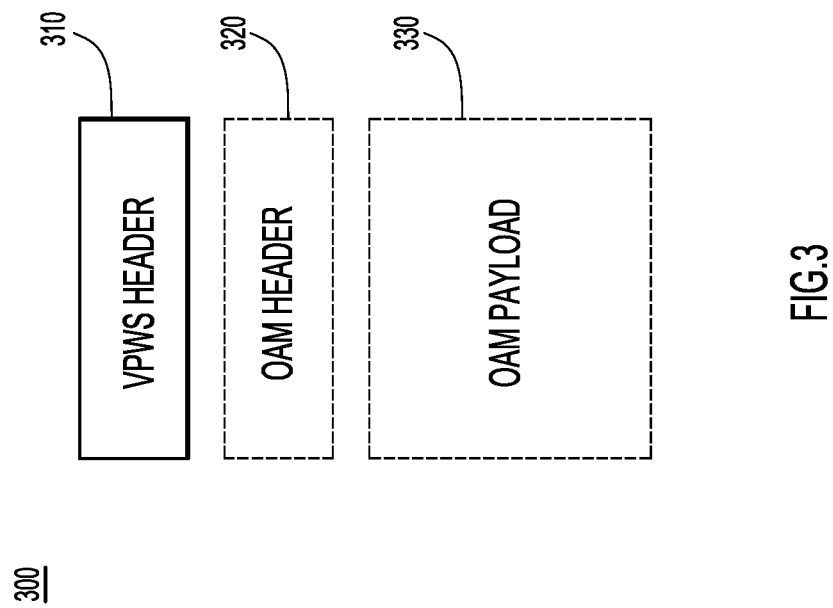
FIG. 3 illustrates a packet format for carrying information over a packet-switched network, according to an example embodiment.

FIG. 3 illustrates an example packet format 300 (e.g., a PLE OAM PW packet format) for carrying information, such as APS information, over PSN 115 (e.g., over working PW 140(1) or protection PW 140(2)). Packet format 300 includes VPWS header 310, OAM header 320, and OAM payload 330. For MPLS-based VPWS, VPWS header 310 may include a Generic Associated Channel (GACh) header; for IP-based VPWS, IP/UDP may be used. OAM header 320 may specify a channel type identifying the packet of packet format 300. In one example, packet format 300 may use a Two-Way Active Measurement Protocol (TWAMP) format, including an associated Type-Length-Value (TLV) that includes an APS control channel.

Figure 4:
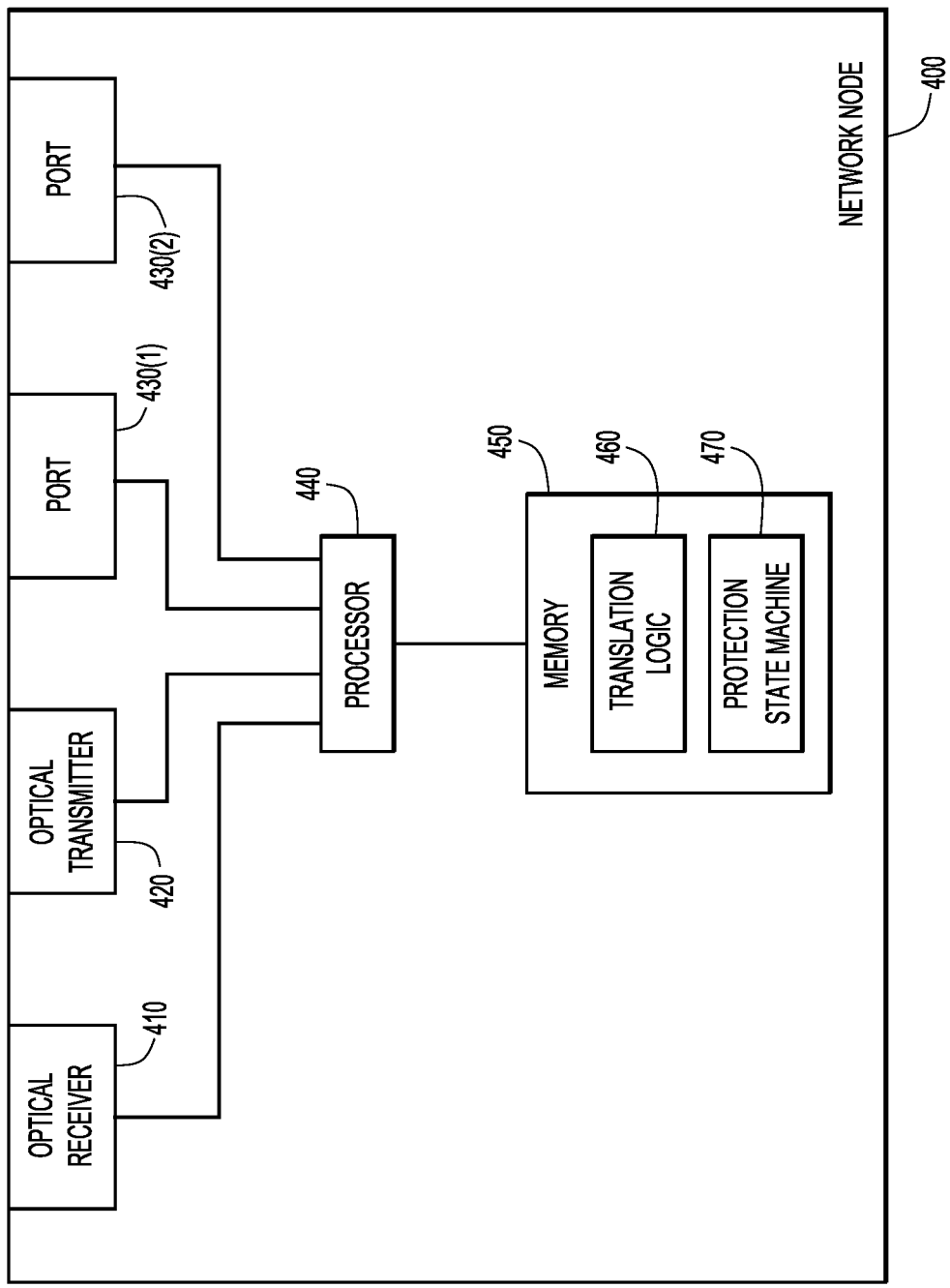
FIG. 4 illustrates a hardware block diagram of a device configured to perform functions associated with operations described herein, according to an example embodiment.

With continued reference to FIG. 1, FIG. 4 illustrates a block diagram of an example network node 400 (e.g., PE node 110, PE node 120(1), PE node 120(2), or PE node 130) that is configured to implement techniques presented herein. Network node 400 includes a network interface in the form of optical receiver 410 and optical transmitter 420 (including optical and electrical modules) and ports 430(1) and 430(2). Network node 400 also includes one or more processors 440 and memory 450. Processor(s) 440 may include any suitable processing entity, such as microprocessors, microcontrollers, Field-Programmable Gate Arrays (FPGAs), Application-Specific Standard Parts (ASSPs), Application Specific Integrated Circuits (ASICs), etc. Other embodiments may be envisioned.

Memory 450 may include read only memory (ROM), Random Access Memory (RAM), magnetic disk storage media devices, optical storage media devices, Flash memory devices, electrical, optical, or other physical/tangible memory storage devices. Thus, in general, memory 450 may comprise one or more tangible (non-transitory) computer readable storage media (e.g., a memory device) encoded with software comprising computer executable instructions and when the software is executed (e.g., by the one or more processors) it is operable to perform operations described herein. In particular, memory 450 may include translation logic 460 (e.g., translation logic 170(1) or translation logic 170(2)) and/or protection state machine 470 (e.g., protection state machine 175(1) or protection state machine 175(2)) that, when executed, enables network node 400 to perform the techniques described herein.

Figure 5:
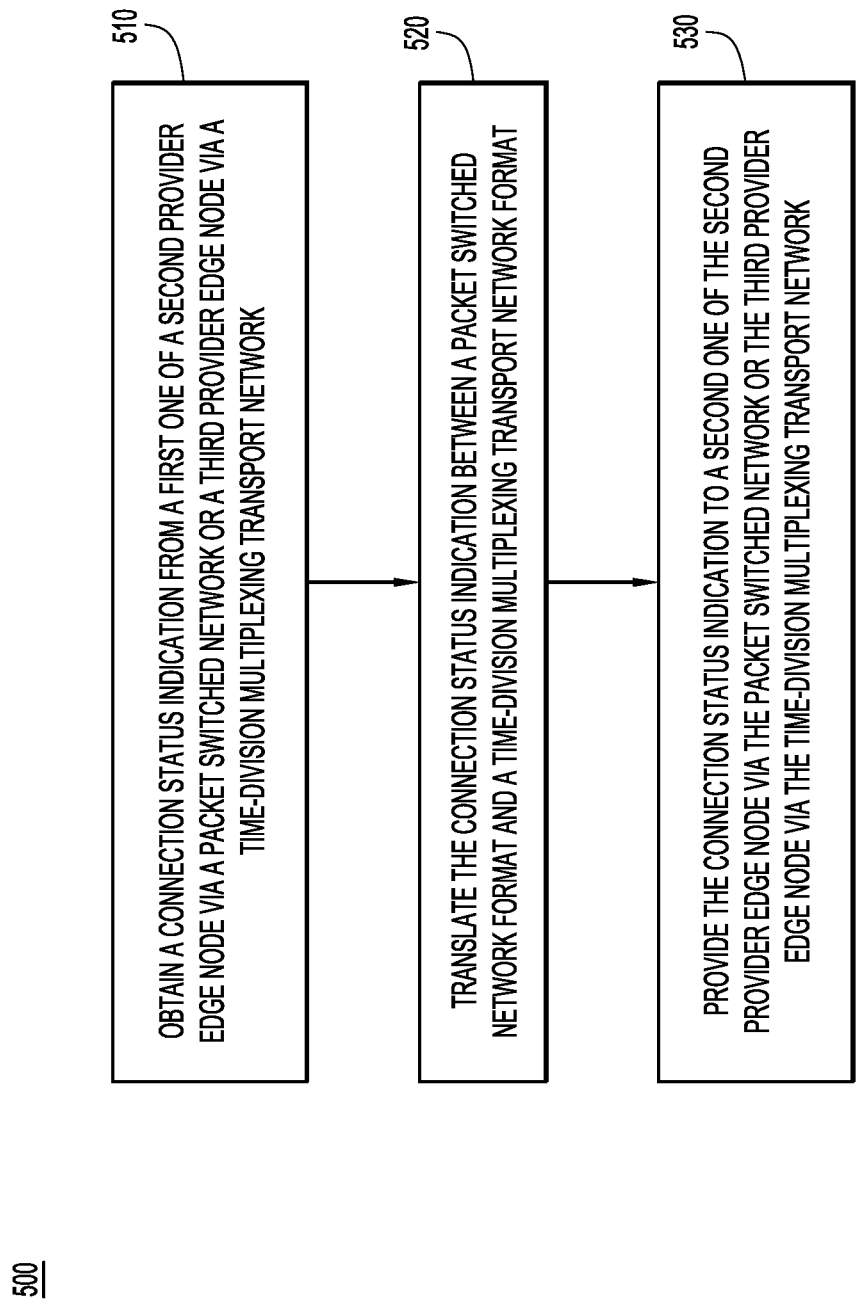
FIG. 5 illustrates a flowchart of a method for performing functions associated with operations described herein, according to an example embodiment.

FIG. 5 is a flowchart of an example method 500 for performing functions associated with operations presented herein. Method 500 may be performed by any suitable entity, such as a first PE node (e.g., PE node 120(1), PE node 120(2), or network node 400). At operation 510, the first PE node obtains a connection status indication from a first one of a second PE node via a PSN or a third PE node via a TDM transport network. At operation 520, the first PE node translates the connection status indication between a PSN format and a TDM transport network format. At operation 530, the first PE node provides the connection status indication to a second one of the second PE node via the PSN or the third PE node via the TDM transport network.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a method is provided. The method comprises: at a first provider edge node: obtaining a connection status indication from a first one of a second provider edge node via a packet switched network or a third provider edge node via a time-division multiplexing transport network; translating the connection status indication between a packet switched network format and a time-division multiplexing transport network format; and providing the connection status indication to a second one of the second provider edge node via the packet switched network or the third provider edge node via the time-division multiplexing transport network.

In one example, the method further comprises: at the second provider edge node: determining that the third provider edge node is to switch over to a fourth provider edge node configured to translate communications between the packet switched network format and the time-division multiplexing transport network format; and providing a connection action request for the third provider edge node to switch over to the fourth provider edge node. In a further example, providing the connection action request includes providing a dedicated Operations Administration and Maintenance (OAM) packet indicating that the third provider edge node is to switch over to the fourth provider edge node. In a still further example, providing the dedicated OAM packet includes providing the dedicated OAM packet via a Border Gateway Protocol message. In another still further example, providing the dedicated OAM packet includes providing the dedicated OAM packet via a dedicated OAM control channel.

In one example, the method further comprises: at the first provider edge node: communicating with a fourth provider edge node configured to translate communications between the packet switched network format and the time-division multiplexing transport network format; and determining that the fourth provider edge node is to become a designated forwarder for the second provider edge node or the third provider edge node. In a further example, the method further comprises: at the first provider edge node: providing, to the second provider edge node, an indication that the fourth provider edge node is to become the designated forwarder. In another further example, the method further comprises: at the fourth provider edge node: providing, to the second provider edge node or the third provider edge node, an indication that the fourth provider edge node is to become the designated forwarder.

In another form, a system is provided. The system comprises: a first provider edge node; and a second provider edge node, wherein the first provider edge node is configured to: obtain a connection status indication from a first one of the second provider edge node via a packet switched network or a third provider edge node via a time-division multiplexing transport network; translate the connection status indication between a packet switched network format and a time-division multiplexing transport network format; and provide the connection status indication to a second one of the second provider edge node via the packet switched network or the third provider edge node via the time-division multiplexing transport network.

In another form, one or more non-transitory computer readable storage media are provided. The non-transitory computer readable storage media are encoded with instructions that, when executed by a processor of a first provider edge node, cause the processor to: obtain a connection status indication from a first one of a second provider edge node via a packet switched network or a third provider edge node via a time-division multiplexing transport network; translate the connection status indication between a packet switched network format and a time-division multiplexing transport network format; and provide the connection status indication to a second one of the second provider edge node via the packet switched network or the third provider edge node via the time-division multiplexing transport network.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   at a first provider edge node:
      obtaining a connection status indication from a first one of a second provider edge node via a packet switched network or a third provider edge node via a time-division multiplexing transport network;
      translating the connection status indication between a packet switched network format and a time-division multiplexing transport network format; and
      providing the connection status indication to a second one of the second provider edge node via the packet switched network or the third provider edge node via the time-division multiplexing transport network; and
   at the second provider edge node:
      determining that the third provider edge node is to switch over to a fourth provider edge node configured to translate communications between the packet switched network format and the time-division multiplexing transport network format; and
      providing a connection action request for the third provider edge node to switch over to the fourth provider edge node.

2. The method of claim 1, wherein:
   providing the connection action request includes providing a dedicated Operations Administration and Maintenance (OAM) packet indicating that the third provider edge node is to switch over to the fourth provider edge node.

3. The method of claim 2, wherein:
   providing the dedicated OAM packet includes providing the dedicated OAM packet via a Border Gateway Protocol message.

4. The method of claim 2, wherein:
providing the dedicated OAM packet includes providing the dedicated OAM packet via a dedicated OAM control channel.

5. The method of claim 1, further comprising:
at the first provider edge node:
communicating with a fourth provider edge node configured to translate communications between the packet switched network format and the time-division multiplexing transport network format; and
determining that the fourth provider edge node is to become a designated forwarder for the second provider edge node or the third provider edge node.

6. The method of claim 5, further comprising:
at the first provider edge node:
providing, to the second provider edge node, an indication that the fourth provider edge node is to become the designated forwarder.

7. The method of claim 5, further comprising:
at the fourth provider edge node:
providing, to the second provider edge node or the third provider edge node, an indication that the fourth provider edge node is to become the designated forwarder.

8. A system comprising:
a first provider edge node; and
a second provider edge node,
wherein the first provider edge node is configured to:
obtain a connection status indication from a first one of the second provider edge node via a packet switched network or a third provider edge node via a time-division multiplexing transport network;
translate the connection status indication between a packet switched network format and a time-division multiplexing transport network format; and
provide the connection status indication to a second one of the second provider edge node via the packet switched network or the third provider edge node via the time-division multiplexing transport network; and
wherein the second provider edge node is configured to:
determine that the third provider edge node is to switch over to a fourth provider edge node configured to translate communications between the packet switched network format and the time-division multiplexing transport network format; and
provide a connection action request for the third provider edge node to switch over to the fourth provider edge node.

9. The system of claim 8, wherein the second provider edge node is configured to:
provide a dedicated Operations Administration and Maintenance (OAM) packet indicating that the third provider edge node is to switch over to the fourth provider edge node.

10. The system of claim 9, wherein the second provider edge node is configured to:
provide the dedicated OAM packet via a Border Gateway Protocol message.

11. The system of claim 9, wherein the second provider edge node is configured to:
provide the dedicated OAM packet via a dedicated OAM control channel.

12. The system of claim 8, further comprising:
a fourth provider edge node configured to translate communications between the packet switched network format and the time-division multiplexing transport network format, wherein the first provider edge node is further configured to:
communicate with the fourth provider edge node; and
determine that the fourth provider edge node is to become a designated forwarder for the second provider edge node or the third provider edge node.

13. The system of claim 12, wherein the first provider edge node is further configured to:
provide, to the second provider edge node, an indication that the fourth provider edge node is to become the designated forwarder.

14. The system of claim 12, wherein the fourth provider edge node is configured to:
provide, to the second provider edge node or the third provider edge node, an indication that the fourth provider edge node is to become the designated forwarder.

15. One or more non-transitory computer readable storage media encoded with instructions that, when executed by a processor, cause the processor to execute operations on behalf of a first provider edge node and a second provider edge node, wherein the operations performed on behalf of the first provider edge node comprise:
obtaining a connection status indication from a first one of the second provider edge node via a packet switched network or a third provider edge node via a time-division multiplexing transport network;
translating the connection status indication between a packet switched network format and a time-division multiplexing transport network format; and
providing the connection status indication to a second one of the second provider edge node via the packet switched network or the third provider edge node via the time-division multiplexing transport network; and
wherein the operations performed on behalf of the second provider edge node comprise:
determining that the third provider edge node is to switch over to a fourth provider edge node configured to translate communications between the packet switched network format and the time-division multiplexing transport network format; and
providing a connection action request for the third provider edge node to switch over to the fourth provider edge node.

16. The one or more non-transitory computer readable storage media of claim 15, wherein the operations performed on behalf of the first provider edge node further comprise:
communicating with the fourth provider edge node configured to translate communications between the packet switched network format and the time-division multiplexing transport network format.

17. The one or more non-transitory computer readable storage media of claim 16, wherein the operations performed on behalf of the first provider edge node further comprise:
determining that the fourth provider edge node is to become a designated forwarder for the second provider edge node or the third provider edge node.

18. The one or more non-transitory computer readable storage media of claim 17, wherein the operations performed on behalf of the first provider edge node further comprise:
providing, to the second provider edge node, an indication that the fourth provider edge node is to become the designated forwarder.

19. The one or more non-transitory computer readable storage media of claim 15, wherein the operation performed on behalf of the second provider edge node of providing the connection action request for the third provider edge node to switch over to the fourth provider edge node comprises providing a dedicated Operations Administration and Maintenance (OAM) packet indicating that the third provider edge node is to switch over to the fourth provider edge node.

20. The one or more non-transitory computer readable storage media of claim 19, wherein the operation performed on behalf of the second provider edge node of providing the dedicated OAM packet comprises providing the dedicated OAM packet via a Border Gateway Protocol message.

* * * * *